Patented Jan. 13, 1931

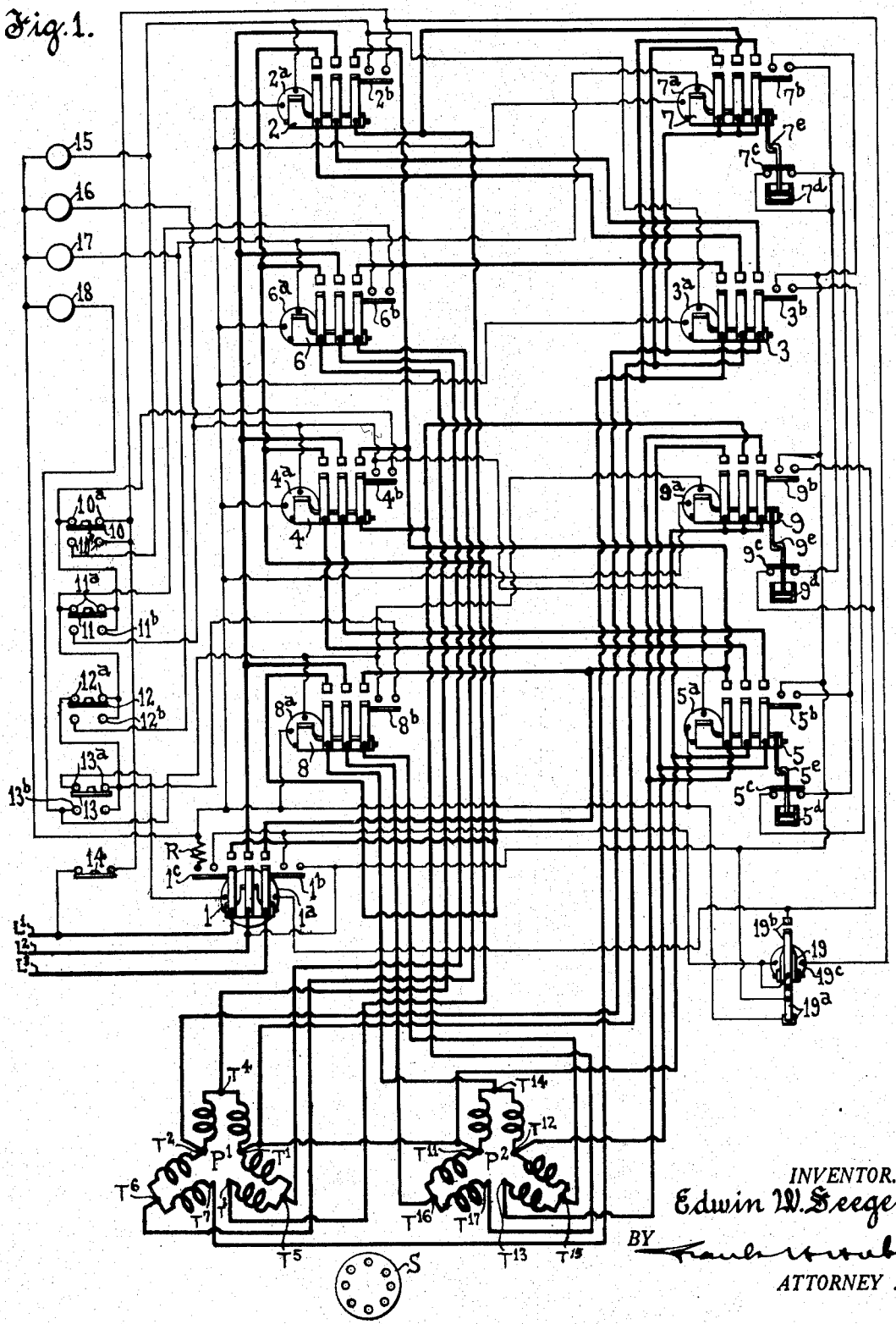

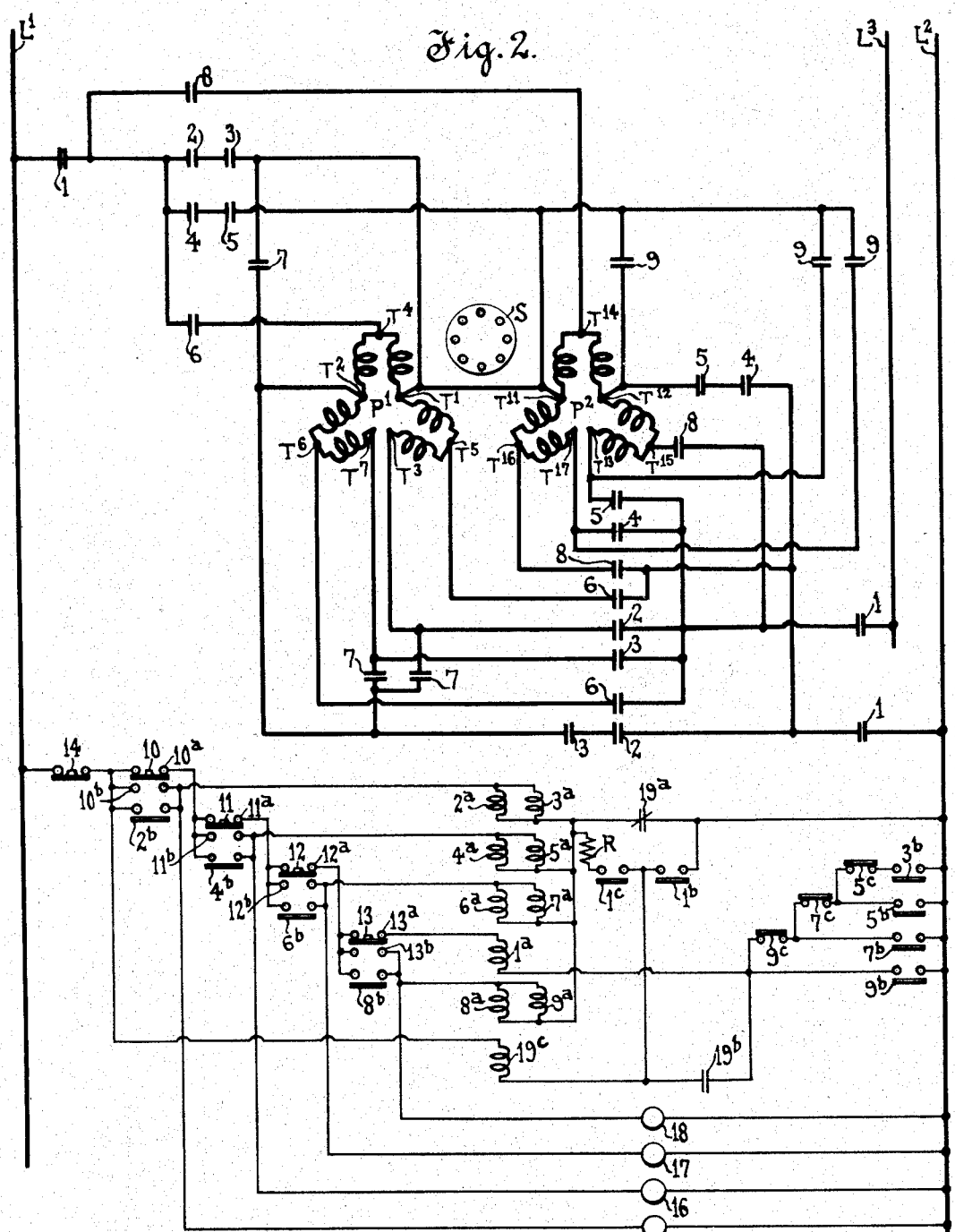

1,789,085

UNITED STATES PATENT OFFICE

EDWIN W. SEEGER, OF SOUTH MILWAUKEE, WISCONSIN, ASSIGNOR, BY MESNE ASSIGNMENTS, TO CUTLER-HAMMER, INC., OF MILWAUKEE, WISCONSIN, A CORPORATION OF DELAWARE

MOTOR CONTROLLER

Application filed March 4, 1927. Serial No. 172,725.

This invention relates to motor controllers and while not limited thereto is particularly applicable to controllers for multi-speed induction motors.

The copending application of Paisley B. Harwood, Serial No. 50,377, filed August 15, 1925, discloses a controller for two speed induction motors including means for preventing the motor and the mechanism driven thereby from being subjected to shock due to braking of the motor upon reduction of the speed thereof. Such means provides for delay in establishment of low speed connections for the motor upon interruption of high speed connections therefor until the motor has slowed down to a speed corresponding to its low synchronous speed. The controller disclosed in the aforesaid application is limited to use in connection with two speed motors and the present invention has among its objects to provide a controller for effecting similar control of induction motors of three or more speeds.

Another object is to provide an improved controller for motors of the aforesaid character including push button controlled means for effecting selection of the motor speeds.

Another object is to provide a push button operated controller of the aforesaid character having means associated therewith for indicating the speed at which the motor is operating.

Various other objects and advantages of the invention will hereinafter appear.

The accompanying drawings diagrammatically illustrate an embodiment of the invention which will now be described, it being understood that the embodiment illustrated may be modified in certain respects without departing from the spirit and scope of the appended claims.

In the drawing

Figure 1 diagrammatically illustrates a four speed controller embodying the invention, and Fig. 2 is an across-the-line diagram of the power circuits and control circuits illustrated in Fig. 1.

Referring to Fig. 1, the same illustrates a 3 phase, four speed induction motor having primary windings $P^1$ and $P^2$ and a secondary S of the squirrel cage type. The primary windings $P^1$ and $P^2$ are each capable of being commutated to provide different pole groupings for different rates of speed and in the embodiment illustrated it is assumed that the primary winding $P^1$ provides for first and third speed operation of the motor, while the primary winding $P^2$ provides for second and fourth speed operation thereof.

A three phase supply circuit for the motor is illustrated by lines $L^1$, $L^2$ and $L^3$, and the connections between said supply circuit and the primary windings of the motor are controlled by an electromagnetically operated 3 pole main switch 1 and a plurality of 3 pole electromagnetically operated speed selector switches 2 to 9, inclusive. As hereinafter set forth, switches 2 and 3 serve to establish first speed connections for primary winding $P^1$, while switches 6 and 7 serve to establish third speed connections therefor. Also, as hereinafter set forth switches 4 and 5 serve to establish second speed connections for primary winding, $P^2$ while switches 8 and 9 serve to establish fourth speed connections therefor.

The main switch 1 and speed selector switches 2 to 9, inclusive, are controlled by push button switches 10 to 13, inclusive, one of said push buttons being provided for each speed. These push buttons are similar to one another in construction and each includes a pair of normally closed contacts designated by reference character "a", and a pair of normally open contacts designated by reference character "b". For purposes hereinafter set forth the push buttons are so connected that the energizing circuit of each button except the first is dependent upon closure of the normally closed contacts "a" of all of the preceding push buttons and it thus follows that operation of any push button serves to render ineffective all push buttons therebeyond during enactment of the function of the controller selected by the push button so actuated. The control means also includes a normally closed push button 14 which controls a common supply line to the aforementioned push buttons.

Each of the speed selector switches 2 to 9, inclusive, is provided with a set of normally open auxiliary contacts designated by reference character "b" and each of the switches 5, 7 and 9 is provided with normally closed auxiliary contacts designated by reference character "c". As shown in Fig. 1 the movable elements of auxiliary contacts "c" associated with switches 5, 7 and 9 are each provided with a dash pot "d" and each of said movable contact elements is connected to its associated selector switch through the medium of a lost motion connection "e" to permit closure thereof against the action of its associated dash pot upon opening of the associated selector switch. For purposes hereinafter set forth the contacts "b" associated with switches 2, 4, 6 and 8 serve to parallel the push button contacts $10^b$, $11^b$, $12^b$ and $13^b$ respectively and also serve to control the energizing circuits of signal lamps 15, 16, 17 and 18, respectively, while the normally open and normally closed auxiliary contacts associated with switches 3, 5, 7 and 9 are arranged in the energizing circuit of main switch 1.

The control means still further includes an electromagnetically operated relay 19 having normally closed contacts $19^a$ and normally open contacts $19^b$. The energizing circuit of relay 19 is controlled by normally open auxiliary contacts $1^b$ associated with main switch 1 and as hereinafter set forth upon response of said relay the contacts $19^a$ cause a resistance R to be included in the energizing circuit of selector switches 2 to 9.

The function and operation of the aforedescribed controller together with the circuit connections therefor will now be more fully described in connection with Fig. 2. Assuming that the control parts are in the position shown in Fig. 1, upon depression of push button 10 the selector switches 2 and 3 will be energized by a circuit extending from line $L^1$ through push button 14, through the normally open push button contacts $10^b$, through the operating windings $2^a$ and $3^a$ of said selector switches, and through the normally closed contacts $19^a$ of relay 19 to line $L^2$. Upon response of the selector switches 2 and 3 the energizing circuit therefor is maintained by the auxiliary contacts $2^b$ associated with selector switch 2, said contacts serving to shunt the push button contacts $10^b$. Upon return of push button 10 to normal position main switch 1 is energized by a circuit extending from line $L^1$ through push button 14, through the normally closed push button contacts $10^a$ to $13^a$, inclusive, through the operating winding $1^a$ of said main switch and thence through the normally closed auxiliary contacts "c" associated with speed selector switches 9, 7 and 5, the auxiliary contacts "b" associated with selector switch 3 to line $L^2$. Main switch 1 in responding serves to establish power connections through the medium of the speed selector switches 2 and 3 for first speed operation of the motor. Upon response of main switch 1 an energizing circuit for relay 19 is established extending from line $L^1$ through the normally closed push button 14, through the operating winding $19^c$ of said relay and thence through the auxiliary contacts $1^b$ of said main switch to line $L^2$. Upon response of relay 19 the contacts $19^a$ thereof open and selector switches 2 and 3 are then maintained energized by a circuit extending from line $L^1$ to and through the operating windings $2^a$ and $3^a$ of said switches as already traced, and through resistance R and auxiliary contacts $1^c$ and $1^b$ associated with main switch 1 to line $L^2$. Also in responding relay 19 establishes a maintaining circuit for itself extending from line $L^1$ through the normally closed push button 14 through the operating winding $19^c$ of said relay through the contacts $19^b$ thereof and thence through auxiliary contacts $9^c$, $7^c$, $5^c$ and $3^b$ of the speed selector switches to line $L^2$. As before stated, the motor operates at first speed upon closure of main switch 1 and selector switches 2 and 3 and operation of the same at this speed is indicated by lamp 15 which is connected across lines $L^1$—$L^2$ through the normally closed push button 14 and the auxiliary contacts $2^b$ associated with speed selector switch 2.

Assume now that the push button 11 is depressed for second speed operation of the motor. Upon depression of such button the energizing circuit for main switch 1 is interrupted through opening of the normally closed contacts $11^a$ and upon opening of main switch 1 the aforedescribed energizing circuit for the speed selector switches 2 and 3 is interrupted by opening of the auxiliary contacts $1^b$ and $1^c$ associated with said main switch. Upon opening of the selector switches 2 and 3 relay 19 is deenergized through opening of the auxiliary contacts $3^b$ and the auxiliary contacts $2^b$ interrupt the energizing circuit for signal lamp 15 and also the shunt circuit around push button contacts $10^b$. The speed selector switches 4 and 5 are then energized by a circuit extending from line $L^1$ through push button 14 and push button contacts $10^a$ and $11^b$ through the operating windings $4^a$ and $5^a$ of the selector switches and thence through the contacts $19^a$ of relay 19 to line $L^2$. In responding switch 4 maintaines itself and also switch 5 in closed position through closure of its auxiliary contacts $4^b$ which parallel push button contacts $11^b$ and said auxiliary contacts also serve to energize the second speed lamp 16 by connecting the same across lines $L^1$—$L^2$ through the medium of push button 14 and the normally closed contacts $10^a$ of push button 10. Upon release of push button 11 main switch 1 is energized by a circuit extending from line L¹ through push button 14, through the normally closed push button contacts 10ᵃ, 11ᵃ, 12ᵃ and 13ᵃ to and through the operating winding of said main switch and thence through the auxiliary contacts "c" of selector switches 9 and 7 and through the auxiliary contacts "b" of selector switch 5 to line L². Upon response of main switch 1 the auxiliary contacts 1ᵇ thereof again establish the aforedescribed energizing circuit for relay 19 and upon response of said relay the contacts 19ᵃ thereof provide for inclusion of resistance R in the energizing circuit of selector switches 4 and 5 through the medium of the main switch auxiliary contacts 1ᶜ and 1ᵇ. Relay 19 then maintains itself in closed position by a circuit extending from line L¹ through push button 14 through the operating winding 19ᵉ of said relay, through the contacts 19ᵇ thereof and thence through the auxiliary contacts "c" of selector switches 9 and 7 and the auxiliary contacts 5ᵇ of selector switch 5 to line L².

Upon depression of push button 12 the controller provides for operation of the motor at its third speed while depression of push button 13 provides for fourth speed operation thereof. In changing from second speed to third speed and from third speed to fourth speed the operation of the controller is similar to that above described.

Upon depression of either of the push buttons 12 or 13 the energizing circuit of the main switch 1 is first interrupted and upon return of said main switch to normal position the auxiliary contacts thereof interrupt the energizing circuit for the selector switches 4—5 or 6—7 as the case may be. Upon opening of either of said sets of selector switches the auxiliary contacts associated therewith interrupt the energizing circuit for the corresponding signal lamp and also interrupt the energizing circuit for relay 19. The contacts 19ᵃ of said relay then establish connections for energization of the selector switches corresponding to the depressed push button and upon response of such selector switches the same are maintained in closed position and the corresponding speed indicating lamp is energized through the medium of auxiliary contacts "b" which shunt the push button corresponding to the closed selector switches. The other auxiliary contacts "b" of the closed selector switches establish connections for energization of main switch 1 upon release of the operated push button and said main switch in closing again establishes an energizing circuit of relay 19, which then functions as hereinbefore described.

In changing to a lower speed the operation of the controller is slightly different than that above described. Assume that the motor is operating at its fourth speed, upon depression of the third speed push button 12 the energizing circuit for the main switch 1 is interrupted and upon opening of said main switch the auxiliary contacts 1ᵇ and 1ᶜ thereof deenergize selector switches 8 and 9. Upon opening of the speed selector switch 9 the auxiliary contacts 9ᵇ thereof interrupt the energizing circuit for the relay 19 and upon return of relay 19 to normal position the contacts 19ᵃ thereof establish an energizing circuit for the third speed selector switches 6 and 7 which maintain themselves as hereinbefore described. Return of push button 12 to normal position connects the operating winding of main switch 1 to line L¹ but circuit between said winding and L² is interrupted until contacts 9ᶜ return to closed position against the action of the associated dash pot 9ᵈ. The contacts 9ᶜ thus introduce a time element in the operation of the controller to delay establishment of power connections for third speed operation of the motor until the motor has slowed down to substantially its third synchronous speed. Upon closure of main switch 1 the relay 19 is energized to function as hereinbefore described.

In reducing the speed of the motor to either its second or first speed, the operation of the controller is similar to that above described except that contacts 7ᶜ delay establishment of power connections for the motor during the transfer from third to second speed and contacts 5ᶜ delay establishment of power connections for the motor during the transfer from second to first speed.

The power connections established by main switch 1 and speed selector switches 2 to 9, inclusive, will now be briefly described in connection with Fig. 2. Upon closure of main switch 1 and speed selector switches 2 and 3 terminals T¹ and T² of the primary winding P¹ are connected to lines L¹ and L² respectively, while terminals T⁷ and T⁸ of said primary winding are connected to line L³. Upon closure of main switch 1 and speed selector switches 4 and 5 terminals T¹¹ and T¹² of primary winding P² are connected to lines L¹—L², respectively, while terminals T¹³ and T¹⁷ of said primary winding are connected to line L³. Closure of main switch 1 and speed selector switches 6 and 7 connects terminals T⁴, T⁵ and T⁶ of primary winding P¹ to lines L¹, L² and L³, respectively, while terminals T¹, T², T³ and T⁷ of said primary winding are connected to each other. Upon closure of main switch 1 and speed selector switches 8 and 9 terminals T¹⁴, T¹⁵ and T¹⁶ of primary winding P² are connected to Lines L¹, L² and L³, respectively, while terminals T¹¹, T¹², T¹³ and T¹⁷ of said primary winding are connected to each other.

What I claim as new and desire to secure by Letters Patent is:

1. In a controller for electric motors having primary windings capable of connection in different relations to provide at least three motor speeds, in combination control means for said windings including an electromagnetically operated main switch, and a plurality of speed selector switches, and means associated with certain of said speed selector switches for delaying closure of said main switch upon operation of said speed selector switches to reduce the motor speed.

2. In a controller for electric motors having primary windings capable of connection in different relations to provide different motor speeds, in combination an electromagnetically operated main switch for the motor, a plurality of speed selector switches therefor, each of said speed selector switches having contacts associated therewith arranged in the energizing circuit of said main switch and means for selectively controlling said speed selector switches and for also controlling said main switch through the medium of the auxiliary contacts associated with said speed selector switches.

3. In a controller for multi-speed induction motors having windings capable of connection in different relations to provide a plurality of motor speeds, in combination control means for said windings including an electromagnetically operated main switch and a plurality of electromagnetically operated speed selector switches, a plurality of push buttons associated with said selector switches for selectively controlling the same and means associated with certain of said speed selector switches for controlling said main switch through the medium of said push buttons, said latter means insuring delay in closure of said main switch upon operation of said speed selector switches to reduce the motor speed.

4. In a controller for multi-speed induction motors having windings capable of connection in different relations to provide a plurality of motor speeds, in combination control means for said windings including an electromagnetically operated main switch and a plurality of electromagnetically operated speed selector switches and means for delaying closure of said main switch upon operation of said speed selector switches to reduce the motor speed comprising contacts associated with certain of said speed selector switches, said contacts being adapted to open upon closure of their associated speed selector switches and to close after a given interval upon opening of such switches.

In witness whereof, I have hereunto subscribed my name.

EDWIN W. SEEGER.